(12) United States Patent
Kobayashi et al.

(10) Patent No.: US 6,675,862 B2
(45) Date of Patent: Jan. 13, 2004

(54) BLIND APPARATUS

(75) Inventors: Ryogo Kobayashi, Sayo-gun (JP); Motohiro Higuchi, Ako (JP); Fusao Takanishi, Yokohama (JP)

(73) Assignees: Matsushita Electric Works, Ltd., Osaka (JP); NHK Spring Co., Ltd., Yokohama (JP)

( * ) Notice: Subject to any disclaimer, the term of this patent is extended or adjusted under 35 U.S.C. 154(b) by 2 days.

(21) Appl. No.: 10/026,457

(22) Filed: Dec. 27, 2001

(65) Prior Publication Data

US 2002/0089209 A1 Jul. 11, 2002

(30) Foreign Application Priority Data

Dec. 28, 2000 (JP) ........................................ 2000-402726

(51) Int. Cl.[7] .................................................. B60J 3/00
(52) U.S. Cl. .................................. 160/370.22; 296/97.8
(58) Field of Search ........................... 160/370.22, 265, 160/68, 73, 74, 75, 82, 310; 296/97.8

(56) References Cited

U.S. PATENT DOCUMENTS

| | | | | |
|---|---|---|---|---|
| 5,752,560 A | * | 5/1998 | Cherng | 160/370.22 |
| 5,791,721 A | * | 8/1998 | Lin | 296/97.8 |
| 6,109,330 A | * | 8/2000 | Crisp | 160/370.22 |
| 6,189,948 B1 | * | 2/2001 | Lin | 296/97.4 |
| 6,216,762 B1 | * | 4/2001 | Lin | 160/370.22 |
| 2001/0017194 A1 | * | 8/2001 | Schlecht et al. | 160/370.22 |

FOREIGN PATENT DOCUMENTS

JP  58161033  10/1983

* cited by examiner

*Primary Examiner*—Blair M. Johnson
(74) *Attorney, Agent, or Firm*—Greenblum & Bernstein, P.L.C.

(57) ABSTRACT

A blind apparatus comprises a drum on which a blind is wound, a motor for rotating the drum, an extrusion mechanism having a foldable arm for thrusting the leading end of the blind in a blind spreading direction with a spring force, a one-way clutch for transmitting the rotating force of the motor to the drum when the drum rotates in a blind take-up direction, a stopper for regulating a position of the arm at a spreading end position of the blind, and a circuit for detecting a motor lock current when taking up the blind. A stopping position in the spreading direction of the blind is detected by the position regulation of the arm by the stopper, and a stopping position in the take-up direction of the blind is detected by detecting the motor lock current. Thus, in a simple structure, the cost is reduced, and the operating sound is suppressed at the same time.

5 Claims, 3 Drawing Sheets

BLIND APPARATUS

BACKGROUND OF THE INVENTION

The present invention relates to a drive apparatus of foldable blind, screen or the like used in car windows or the like.

Conventionally, a blind apparatus as disclosed in Japanese Unexamined Utility Model Publication No. 58-161033 has been known. This conventional apparatus comprises, as shown in FIG. 4 and FIG. 5, a hollow cylindrical drum 1, a blind 2 foldably wound on the drum 1, a bottom bar 3 attached to the leading end of the blind 2, a brace 4 fitted and fixed to a wall 5 of eaves or the like for rotatably supporting the drum 1, and an arm 6 for coupling the bottom bar 3 and the brace 4. The arm 6 is foldable in the blind spreading direction, and is designed to applying an extruding force in the blind spreading direction to the bottom bar 3 of the blind 2 by a spring not shown. That is, the arm 6 has an extrusion mechanism for applying a stretching force to the blind 2.

The drum 1 is rotatably supported on fixed shafts 7, 8 fixed to the braces 4 by way of bearings 9, 10. Inside of the drum 1, as shown in FIG. 5, a motor 15 with a reduction gear as the rotating force source is accommodated in a state fixed on the fixed shaft 7 and not contacting with the drum inner wall 1a.

A rotary shaft 12 of the motor 15 is mounted on the drum 1 through a one-way clutch 13. The one-way clutch 13 functions to transmit the rotating force to the drum 1 when the rotary shaft 12 rotates in the blind take-up direction.

The fixed shaft 7 is hollow, and lead wires 14 of the motor 15 are taken out through the inside of the fixed shaft 7.

In this configuration, explaining the spreading and take-up operation of the blind 2 by the drum 1, first, as indicated by double dot chain line in FIG. 4, the blind 2 is taken up on the drum 1, and when the motor 15 is unlocked and rotated in the blind spreading direction, the blind 2 is expanded to the spread final end by the pushing force of the arm 6 while the expanding speed is being regulated at the rotating speed of the motor 15 by the one-way clutch 13. When the blind 2 is sent out to the specified position, the drum 1 receives a rotation stopping force from a rotation stopping mechanism (not shown) of the drum 1, and the motor 15 is decoupled from the drum 1 by the one-way clutch 13, so that the rotary shaft 12 is set in idling state. As a result, only by setting the expanding rotation time of the motor 15 slightly longer, reverse winding or loosening of the blind 2 can be securely prevented. On the other hand, in the spread state of the blind 2, when the motor 15 is rotated in the blind take-up direction, the rotary shaft 12 is coupled with the drum 1 through the one-way clutch 13, and the drum 1 is rotated by the rotating force of the rotary shaft 12, so that the blind 2 can be taken up.

In the conventional blind apparatus, however, switch or other detecting mechanism was needed in order to detect the upper limit position and lower limit position of the blind 2. In addition, the rotation stopping mechanism of the drum 1 and lock mechanism of the drum 1 were needed after spreading and after take-up of the blind 2. Further, after taking up the blind 2, in order to eliminate effects of inertia of rotation of the motor 15, mechanisms were necessary for coupling the internal rotor of the motor 15 and the rotary shaft by frictional clutch or magnetic clutch, and allowing the rotary shaft to slip in an overloaded state, and the configuration of the blind apparatus was much complicated, and an inexpensive product could not be presented.

Conventionally, moreover, since the motor 15 is disposed in the drum 1, only spur gears, helical gears or planetary gears can be used as the reduction gears, and the operating noise was loud.

SUMMARY OF THE INVENTION

The present invention is directed to solve the above-mentioned problem, and it is hence an object of the present invention to provide an inexpensive and less noisy blind apparatus having a simple structure.

It is another object of the invention to present a blind apparatus capable of preventing looseness of the blind after spreading the blind, extending the service life of the motor mechanical parts, and unlocking immediately if a foreign matter is caught in the blind, and being further advantageous in the aspect of safety and much lowered in operating sound level.

In order to achieve the above-mentioned object, according to one aspect of the present invention, a blind apparatus comprising a drum on which a blind is wound, a motor for rotating the drum in a blind spreading direction or a blind take-up direction in order to expand or take up the blind, an extrusion mechanism having a foldable arm for thrusting the leading end of the blind thereby a spring force in the blind spreading direction, and a one-way clutch for transmitting the rotating force of the motor to the drum when the drum rotates in the blind take-up direction, further comprises: a stopper for stopping move of the arm near the blind spreading end position, and a detecting circuit for detecting a motor lock current when taking up the blind, wherein a stopping position in the blind spreading direction is detected by the arm position regulation by the stopper, and a stopping position in the blind take-up direction is detected by the motor lock current by the detecting circuit.

In the apparatus of the invention, when spreading the blind, the upper limit position of the blind can be detected only by stopping the blind at the spreading end position by a stopper. On the other hand, when taking up the blind, the lower limit position of the blind can be detected by detecting a motor lock current. As a result, the upper and lower limit detecting mechanism (switch and the like) used in the conventional blind can be omitted, and the drum rotation stopping mechanism and the drum lock mechanism after the spreading and take-up operation of the blind are not necessary. Hence, an inexpensive blind apparatus can be presented in a simple structure.

According to a feature of the present invention, a control circuit stops after driving the motor in the spreading direction when spreading the blind for a specified time required for the blind to reach the spreading end position, and then drives the motor for a short time in the blind take-up direction, then, looseness of the blind caused by not applying stretching force to the blind with the arm position regulation can be prevented.

According to a further feature of the present invention, a control circuit stops the motor after detecting the motor lock current by the detecting circuit in the blind take-up operation, and then drives the motor for a short time in the blind spreading direction, then, load applied to the motor can be removed, and hence the service life of motor mechanical parts can be extended, and the blind apparatus is extended in the service life.

According to a further feature of the present invention, a control circuit stops the motor when detecting the motor lock current by the detecting circuit at a blind take-up intermediate position, and then drives the motor for a short time in the blind spreading direction, and if a foreign matter is caught in while taking up the blind, the foreign matter can be removed easily. In particular, when a part of body of a person is caught in the blind, the blind reverse rotation mechanism is put in effect, and it is unlocked immediately, and it is also enhanced in the aspect of safety.

According to a further feature of the present invention, a reduction gear mechanism comprising a drive side worm and a driven side worm wheel is disposed between an output shaft of the motor and a rotary shaft of the drum, and a helix angle of gears of the worm and the worm wheel is set so that a direction of load applied in a thrust direction of the worm wheel from the drive side worm in the blind spreading operation may be identical with a direction of load applied in the thrust direction of the worm wheel from the arm through the rotary shaft of the drum, and in the spreading operation of the blind, the worm wheel always rotates while being pressed to one side in the thrust direction and jerkiness in the thrust direction is prevented, and the operating sound level is lowered in the spreading operation. As a reduction gear mechanism, by using a worm and the worm wheel having a self-locking function, effects of inertia of rotation of the motor can be eliminated, and the lock mechanism of drum after taking up the blind, and the frictional clutch or magnetic clutch inside the motor required in the prior art can be omitted, and moreover since by rotating the motor reversely after locked, the motor is unlocked so that the rotary shaft does not be slipped in overloaded state, and the slip arresting mechanism of the rotary shaft can be also omitted.

DETAILED DESCRIPTION OF THE PREFERRED EMBODIMENT OF THE PRESENT INVENTION

A preferred embodiment of the present invention is explained below by referring to the accompanying drawings.

Figure 1:
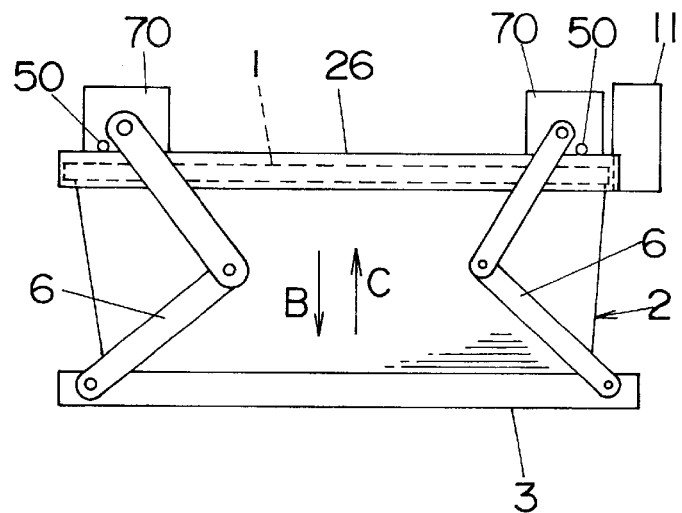
FIG. 1 is a front view showing an embodiment of the present invention.
Figure 2:
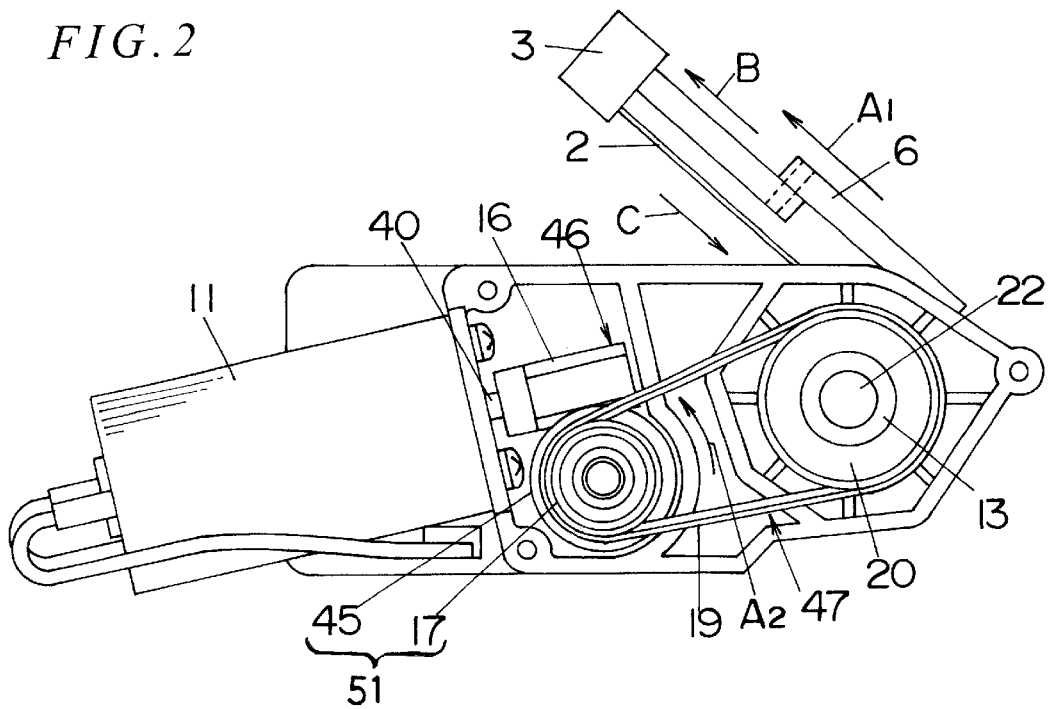
FIG. 2 is a side sectional view of the inside of the drive mechanism of the same.
Figure 3:
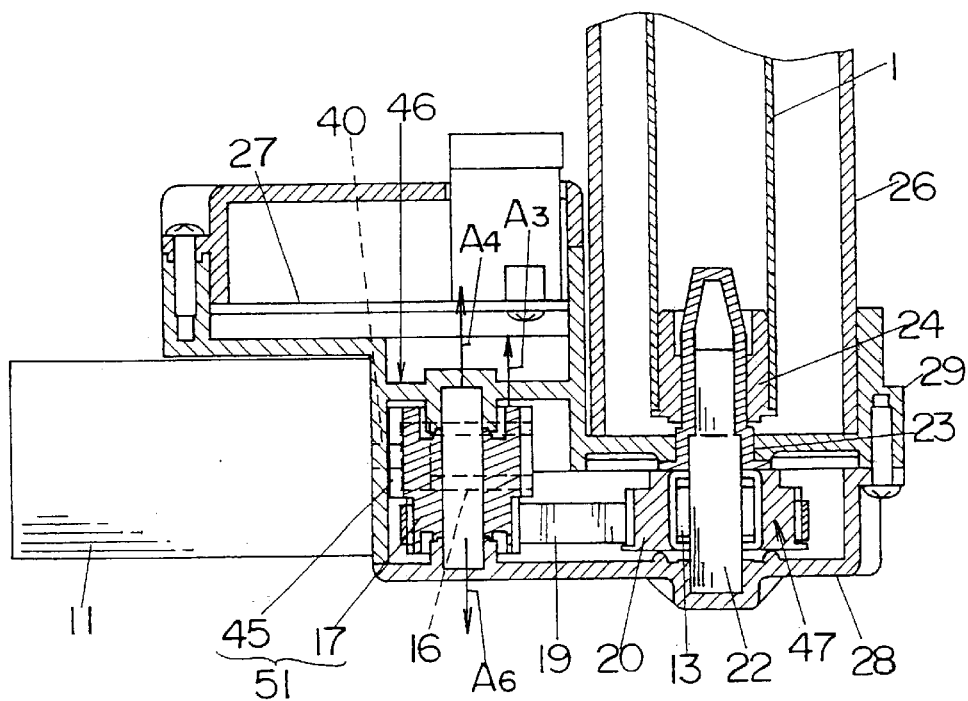
FIG. 3 is a plan sectional view of the inside of the drive mechanism of the same.
Figure 4:
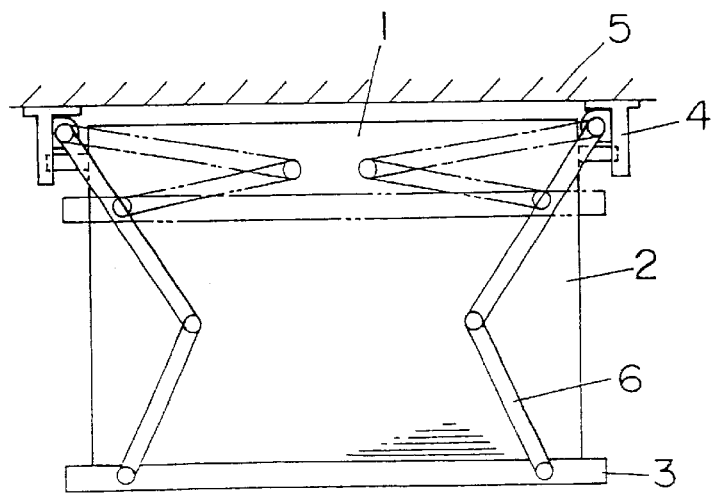
FIG. 4 is a front view of a prior art.
Figure 5:
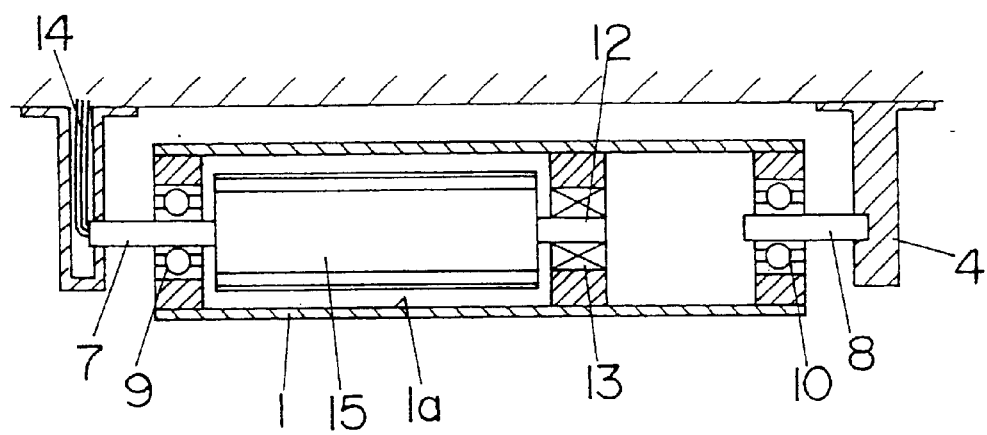
FIG. 5 is a plan sectional view of the prior art.

FIG. 1 to FIG. 3 show a car-mount blind apparatus for explaining an embodiment of the invention. In the car-mount blind apparatus of the embodiment, a drum 1 on which a blind 2 is wound is rotatably accommodated inside of an extended frame 26 fitted and fixed to a car window frame or the like, and the blind 2 is designed to be expanded from a lower opening of the frame 26. The blind 2 is a member including an awning such as screen. Outside of the frame 26, a motor 11 is disposed as driving source for rotating the drum 1 in a blind spreading direction B or a blind take-up direction C for spreading or storing the blind 2 automatically, and by making use of the rotation of the motor 11, the blind 2 is automatically taken up on the drum 1. The frame 26 is attached to a wall not shown.

Between an output shaft 40 of the motor 11 and a rotary shaft 22 of the drum 1, a reduction gear mechanism 46 and a drive transmission mechanism 47 are disposed. The reduction gear mechanism 46 comprises a drive side worm 16 fixed to the output shaft 40 of the motor 11 and a driven side worm wheel 45 to be engaged therewith. In this embodiment, the helix angle of the gears of the worm 16 and the worm wheel 45 is set, as shown in FIG. 3, so that a direction A4 of load applied in a thrust direction of the worm wheel 45 from the drive side worm 16 in spreading operation of the blind 2 may be identical with a direction A3 of load applied in the thrust direction of the worm wheel 45 from an arm 6 by way of the rotary shaft 22 of the drum 1, a pulley 20, and a timing belt 19. In this configuration, as mentioned below, in the spreading operation of the blind 2, jerkiness of the worm wheel 45 in the thrust direction can be suppressed, and the operating sound is reduced.

The drive transmission mechanism 47 comprises a gear 51 integrating the worm wheel 45 and a drive side pulley 17, and the timing belt 19 is wound on the drive side pulley 17 and the driven side pulley 20, and the driven side pulley 20 is coupled to the rotary shaft 22 of the drum 1 through a one-way clutch 13. While the output shaft 40 of the motor 11 is rotating in the blind take-up direction C, the one-way clutch 13 transmits the rotating force to the drum 1. In FIG. 3, the drum 1 and the rotary shaft 22 are connected by way of bushes 23, 24. Cases 28, 29 fixed to the frame 26 hold the gear 51, shafts and others, and incorporate a control circuit 27 for controlling the motor 11. The control circuit 27 includes a detecting circuit for detecting a motor lock current.

A bottom bar 3 is attached to the leading edge of the blind 2 as a weight, and one end of the foldable arm 6 is rotatably held on this bottom bar 3. The other end of the arm 6 is rotatably held on the frame 26. The arm 6 is pulled in the blind spreading direction B by a spring (not shown) loaded in a spring case 70, and the blind 2 is always provided with a stretching force toward the blind spreading direction B by means of the arm 6. The spring case 70 is fixed on the frame 26. The spring case 70 and the arm 6 construct an extrusion mechanism for thrusting the leading end of the blind thereby a spring force in the blind spreading direction.

At both right and left sides of the frame 26, stoppers 50 are provided. Each stopper 50 is disposed oppositely to each other at the upper end of the arm 6 at both sides. The stopper 50 abuts against the arm 6 near the spreading endposition of the blind 2, and is intended to stop movement of the arm 6. By such position regulation of the arm 6, the lower limit position of the blind 2 is detected, while the stopping position in the take-up direction of the blind 2 is detected by detecting the motor lock current.

The spreading and take-up operation of the blind 2 by the drum 1 of the invention is explained. First, with the blind 2 being on the drum 1, when the motor 11 is driven to rotate the drum 1 in the blind spreading direction B, the blind 2 is expanded by a pushing force of the arm 6. At this time, the blind 2 is sent out by the pushing force of the arm 6 while the expanding speed is being regulated by the one-way clutch 13. Further, as the motor 11 rotates and the blind 2 is sent out, the arm 6 pushing out the blind 2 abuts against the stopper 50, and the move of the arm 6 is regulated, and the pushing force to the blind 2 is eliminated. In this state, the motor 11 still continues to rotate, but since the pushing force to the blind 2 is lost, the one-way clutch 13 idles, and the drum 1 does not rotate although the gear 51 connected to the output shaft 40 of the motor 11 and the driven side pulley 20 are rotating, and hence reverse winding phenomenon of the blind 2 does not take place. The motor 11 operates for a preset time, and stops, and further rotates reversely in the blind take-up direction C for a short time, thereby eliminating looseness of the blind 2.

With the blind 2 being spread, when the motor 11 is rotated in the blind take-up direction C, the rotation of the motor 11 is transmitted to the drum 1 by way of the gear 51, the drive side pulley 17, the timing belt 19, the driven side pulley 20, and the one-way clutch 13, and as the drum 1 rotates, the blind 2 is taken up. The motor 11 further rotates to take up the blind 2, and finally the bottom bar 3 at the leading end of the blind 2 abuts against the arm 6 or the frame 26, and the rotation of the drum 1 is regulated, and the motor 11 is locked. In this locked state, the motor 11 increases in the current value as known well, and by detecting the current value of the motor lock current, the stopping position when taking up the blind 2 is detected. In this locked state, since a large load is applied to mechanical parts of the motor 11 (gear 51, pulley 17, timing belt 19, and the like), and thereby by rotating the motor 11 in the blind spreading direction B for a short time after detection of motor lock, the load applied to these mechanical parts can be eliminated.

Thus, the invention comprises the stopper 50 for regulating the position of the arm 6 at the spreading end position of the blind 2, and the detecting circuit for detecting the motor lock current when taking up the blind 2, and the stopping position in the spreading direction B of the blind 2 is defined or set by the position regulation of the arm 6 by the stopper 50, and the stopping position in the take-up direction C of the blind 2 is detected by detection of the motor lock current by the detecting circuit. Thus, the conventional upper and lower limit detecting mechanism (switch and the like) of the blind 2 can be omitted, and also the rotation stopping mechanism of the drum 1 and the lock mechanism of the drum 1 after spreading and take-up operation of the blind 2 are not necessary, so that an inexpensive blind apparatus can be presented in a simple structure.

Moreover, since the motor 11 is disposed outside of the drum 1, and the worm 16 and the worm wheel 45 operating at a low sound level can be used as the reduction gear mechanism 46. After the take-up operation of the blind 2, by making use of a self-locking mechanism of the worm 16 and the worm wheel 45, effects of inertia of rotation of the motor 11 can be eliminated, and unlike the prior art, it does not require the lock mechanism of the drum 1 after taking up the blind 2, or frictional clutch or magnetic clutch in the motor 11, and moreover since the rotary shaft 22 does not slip in overloaded state, the mechanism for arresting slip of the rotary shaft 22 is not needed, and the structure is further simplified.

When reaching the spread stopping position of the blind 2, by regulating the position of the arm 6 by the stopper 50, pushing force in the stretching direction to the blind 2 is lost, and the blind 2 may be loose, but in the embodiment, as mentioned above, after the blind 2 is stopped at the spreading end position, the motor 11 drives the blind 2 in the blind take-up direction C for a specific short time, and looseness in the blind 2 is eliminated, and appearance is not spoiled.

Further, in the structure in which the stopping position in the blind take-up direction C is detected by the motor lock current, and the motor 11 is locked, load is always applied in the motor 11, and the service life of strength of mechanical parts of the motor 11 is sacrificed, but in this embodiment since the motor 11 is driven in a specific short time in the blind spreading direction B after stopping of the motor 11 by the motor lock current, the load applied to the motor 11 is eliminated, and the service life of mechanical parts of the motor 11 can be extended.

Such reverse rotation operation in the blind spreading direction B of motor lock current detection is also designed to function when a foreign matter is caught during take-up operation of the blind 2. That is, when the blind 2 is stopped due to caught foreign matter, by reverse rotation operation in the blind spreading direction B, the motor 11 and the blind 2 are unlocked, and the foreign matter can be removed easily. Or, when the motor lock current is detected at an intermediate take-up position of the blind 2, the motor 11 is stopped, and by driving the motor 11 for a specific short time in the blind spreading direction B, the foreign matter can be also removed easily. In particular, when a part of body of person is caught in the blind 2, by the reverse rotation operation, it is unlocked immediately, so that more beneficial control is realized also in the aspect of safety.

In FIG. 2 and FIG. 3, in the spreading operation of the blind 2 increasing the operating sound, the helix angle of the gears is set so that the direction A4 for moving the worm wheel 45 in the thrust direction by rotation of the worm 16 may be identical with the direction A3 for moving the worm wheel 45 in the thrust direction by the pushing force applied on the blind 2. More specifically, the blind 2 is always provided with a pushing force A1 in a specific direction (blind spreading direction B) by the arm 6, and this pushing force A1 is applied to the worm wheel 45 in a counterclockwise direction A2 in FIG. 2, by way of the blind 2, the drum 1, the bushes 23, 24, the one-way clutch 13, the driven side pulley 20, the timing belt 19, and the drive side pulley 17, and a partial force for moving in the thrust direction A3 acts on the worm wheel 45, and this partial force is directed in the direction of the control circuit 27 in FIG. 3. On the other hand, when spreading the blind 2, the motor 11 is rotated in the counterclockwise direction as seen from the output shaft 40 side, and the direction A3 of the partial force of the force in the thrust direction of the gear 51 of the worm wheel 45 is directed toward the direction of the control circuit 27 in FIG. 3. Therefore, the worm wheel 45 rotates in a state being pressed in the direction to the side of the control circuit 27, so that jerkiness in the thrust direction is eliminated.

When taking up the blind 2, the motor 11 rotates in the clockwise direction as seen from the output shaft 40 side, and the direction A3 of the partial force in the thrust direction of the worm wheel 45 by the thrusting force of the arm 6, and a direction A6 of the force in the axial direction applied to the worm wheel 45 by rotation of the worm 16 are opposite to each other, but since load applied on the gear is large when taking up the blind 2, the frictional resistance in the engaging portion of the worm 16 and the worm wheel 45 is larger than the partial force by the thrusting force of the arm 6, thereby overcoming the partial force by the thrusting force of the arm 6, so that the worm wheel 45 may be rotated without jerkiness in a state being pressed to the case 28 side. As a result, in the take-up operation, jerkiness of the worm wheel 45 in the thrust direction can be suppressed, and operating sound of the blind apparatus can be kept low in both cases. Thus, by properly setting the helix angle of the gears, a blind apparatus of low operating sound level can be presented at low cost.

The invention is not limited to this embodiment, but may be changed and modified in various forms without departing from the true spirit and scope of the invention.

The present disclosure relates to subject matter contained in priority Japanese Patent Application No. 2000-402726, filed on Dec. 28, 2000, the contents of which is herein expressly incorporated by reference in its entirety.

What is claimed is:

1. A blind apparatus comprising a drum on which a blind is wound, a motor for rotating the drum in a blind spreading direction or a blind take-up direction in order to expand or take up the blind, an extrusion mechanism having a foldable arm for thrusting the leading end of the blind by a spring force in the blind spreading direction, and a one-way clutch for transmitting the rotating force of the motor to the drum when the drum rotates in the blind take-up direction, further comprising:

a stopper for regulating arm position by stopping movement of the arm near the blind spreading end position, and a detecting circuit for detecting a motor lock current when taking up the blind, wherein a stopping position in the blind spreading direction is defined by the arm position regulation by the stopper, and a stopping position in the blind take-up direction is detected by the motor lock current by the detecting circuit.

2. The blind apparatus according to claim 1, further comprising:

a control circuit for controlling motor driving, wherein this control circuit stops after driving the motor in the spreading direction when spreading the blind for a specified time required for the blind to reach the spreading end position, and then drives the motor for a short time in the blind take-up direction.

3. The blind apparatus according to claim 1, further comprising:

a control circuit for controlling motor driving, wherein this control circuit stops the motor after detecting the motor lock current by the detecting circuit in the blind take-up operation, and then drives the motor for a short time in the blind spreading direction.

4. The blind apparatus according to claim 1, further comprising:

a control circuit for controlling motor driving, wherein this control circuit stops the motor when detecting the motor lock current by the detecting circuit at a blind take-up intermediate position, and then drives the motor for a short time in the blind spreading direction.

5. The blind apparatus according to claim 1, wherein a reduction gear mechanism comprising a drive side worm and a driven side worm wheel is disposed between an output shaft of the motor and a rotary shaft of the drum, and a helix angle of gears of the worm and the worm wheel is set so that a direction of load applied in a thrust direction of the worm wheel from the drive side worm in the blind spreading operation may be identical with a direction of load applied in the thrust direction of the worm wheel from the arm through the rotary shaft of the drum.

* * * * *